United States Patent

Pigage et al.

[15] 3,641,431
[45] Feb. 8, 1972

[54] METHOD FOR INSPECTING AND ADJUSTING CUTTER BLADES

[72] Inventors: Robert F. Pigage, Rochester; Arthur B. Ryan, Victor; Robert E. Smith, Rochester, all of N.Y.

[73] Assignee: The Gleason Works, Rochester, N.Y.

[22] Filed: Oct. 1, 1968

[21] Appl. No.: 764,223

[52] U.S. Cl. ...................................324/61 R, 33/174 L
[51] Int. Cl. ...........................................G01n 27/26
[58] Field of Search ......................324/61; 33/174, 175

[56] References Cited

UNITED STATES PATENTS

| | | | |
|---|---|---|---|
| 3,504,279 | 3/1970 | Foster et al. | 324/61 |
| 2,417,062 | 3/1947 | Coake | 33/174 |
| 2,842,738 | 7/1958 | Warnick | 324/61 |
| 3,428,889 | 2/1969 | Mayer | 324/61 |

FOREIGN PATENTS OR APPLICATIONS 591,490   8/1947   Great Britain..........................324/61

*Primary Examiner*—Edward E. Kubasiewicz
*Attorney*—Cushman, Darby & Cushman and Morton A. Polster

[57] ABSTRACT

A cutter inspection device and a method of operating the device for determining cutter blade settings by measuring an air gap is disclosed. The device comprises an electronic measuring unit, with a capacitance probe that measures an air gap having a value dependent upon a blade setting. The air gap is formed between the capacitance probe and the cutter blade for some blade setting measurements and in other blade setting measurements, the air gap is formed between the capacitance probe and a contact element in contact with a surface or edge of a cutter blade.

2 Claims, 7 Drawing Figures

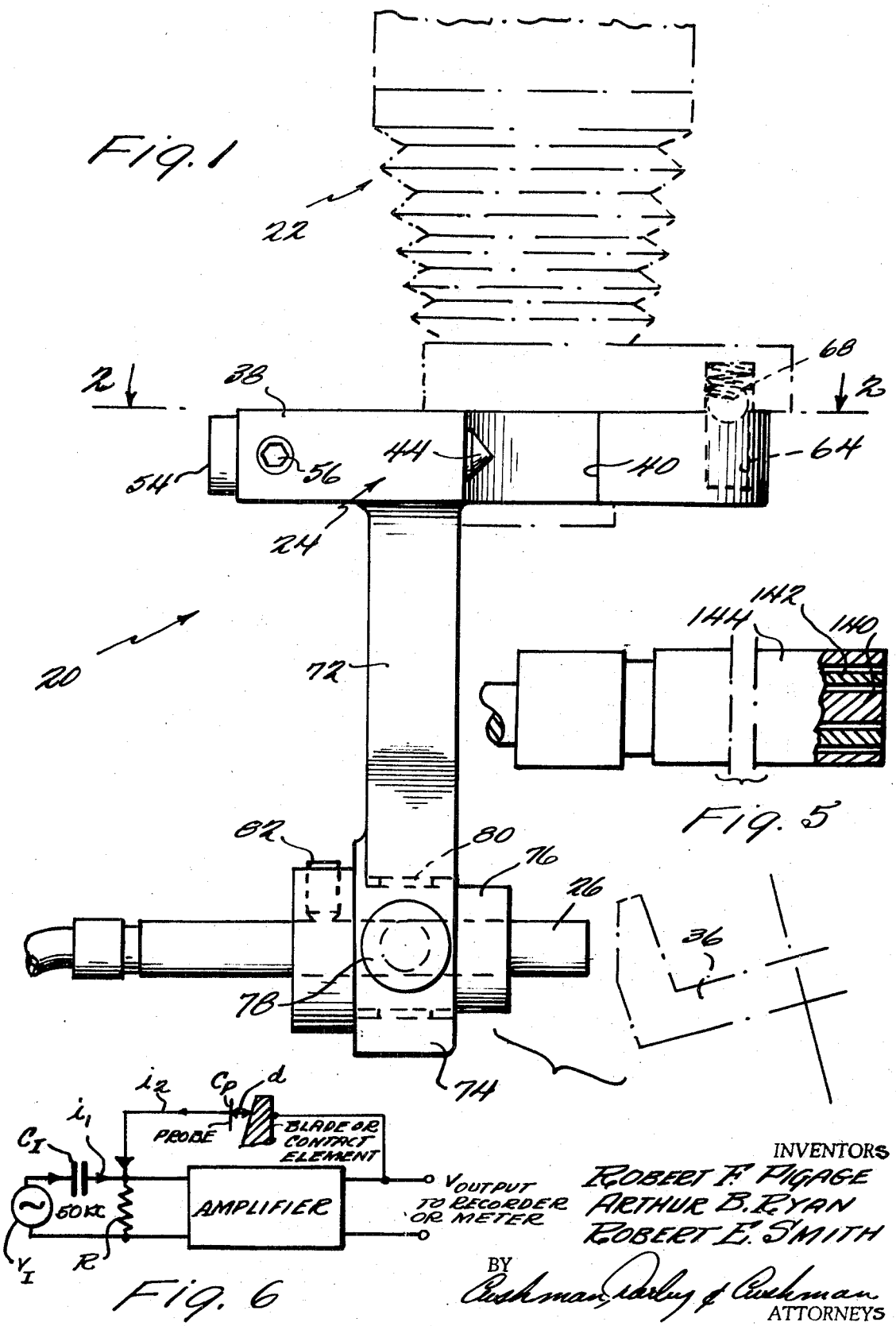

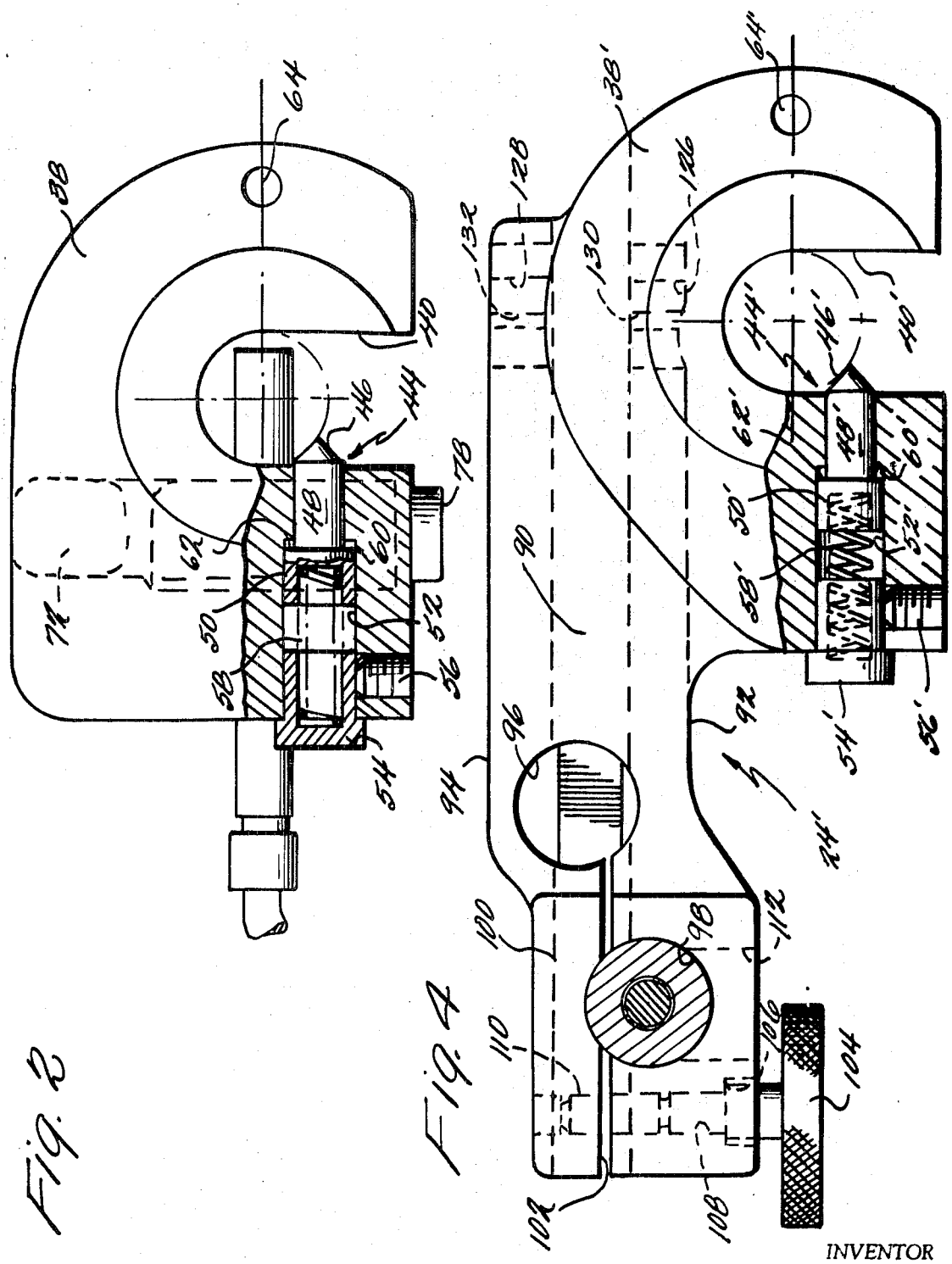

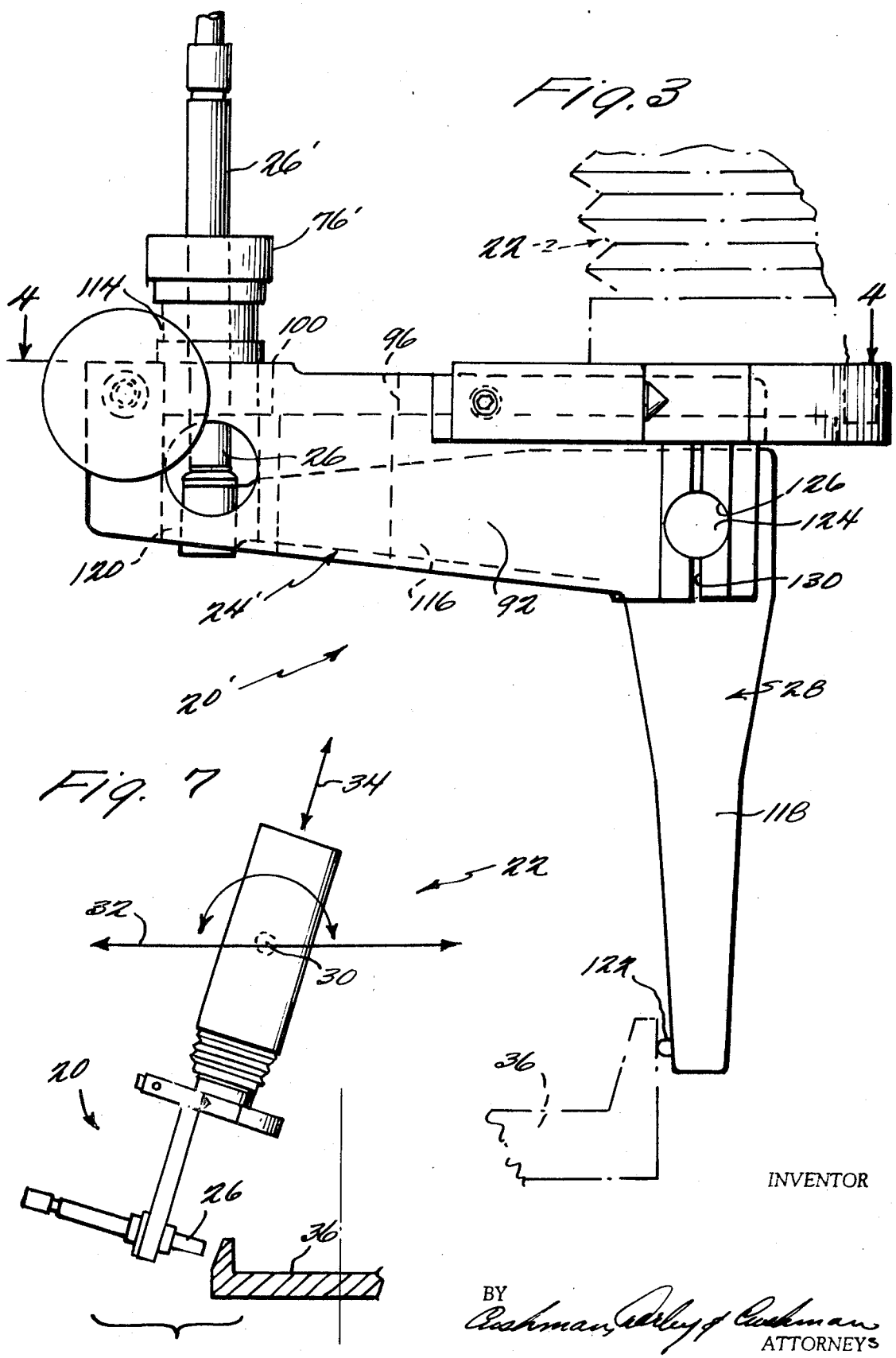

METHOD FOR INSPECTING AND ADJUSTING CUTTER BLADES

BRIEF DESCRIPTION OF THE INVENTION

The present invention relates to a cutter inspection and truing operation and, in particular, to a cutter inspection apparatus and method which measures blade positions more accurately than previously known inspection techniques due to the novel use of an electronic measuring unit which measures the dimension of an air gap formed between a capacitance probe and a cutter blade or contact element.

The present invention is part of an overall, general development of the Gleason Works which includes several inventions besides that disclosed and claimed herein. This development includes other inventions such as a novel structural orientation of center parts, a novel cradle housing and cradle assembly, a novel ratio control or ratio change mechanism, novel control means for the generating train, a novel workhead assembly, novel means for conveying gears or gear blanks to the cutting stations and transferring them between cutting stations with novel means for automatic stock division in going from one station to the other, a novel control means for controlling the operation of the work loading and unloading and automatic stock division mechanisms, a novel chamfering means designed to remove burrs, etc., from the roughed gears, and other novel structures and techniques, all of which are being covered in a series of patent applications. These applications are: Ser. Nos. 764,212, 764,213, 764,214, 764,215, 764,216, 764,217, 764,218, 764,219, 764,220, 764,221, 764,222, filed contemporaneously herewith, and the disclosures of which are all incorporated herein by reference.

While the present development is primarily intended to be used for truing cutters utilized in the production of hypoid pinions for the automotive industry, it will be apparent to those skilled in the art that the present invention can be used for checking and truing other types of gear cutters where great accuracy in the cutter blade settings is required.

After the blades on a cutter have been sharpened, it is necessary to inspect and, if necessary, correct the blade positions on the cutter prior to remounting the cutter on the pinion generating machine. This operation is performed on a cutter inspection machine.

Heretofore, the radial distances of the blade cutting edges relative to the central axis of a cutter have been determined by means of a probe which contacted the cutting edge of the blade or the cutting side face of the blade at a point behind the leading cutting edge of the blade. The first method of determining the radial setting of the blade has proved unsatisfactory since a sharpened edge has irregularities such as nicks and burrs which can cause measurements to be off by values up to 0.001 of an inch or more when an accuracy of twenty-millionths of an inch is desired.

With the second method of determining the radial distance of the cutting edge of the blade from the axis of the cutter, a second type of error has been introduced into the measurements. By contacting the cutting side faces of the blades rather than the leading cutting edge, the error in measurements due to irregularities such as burrs and nicks along the leading edge is eliminated. However, the cutting side faces are always relieved back of their cutting edges and such a relief is usually accomplished by grinding these faces as helical surfaces coaxial with the cutter axis so that upon sharpening of a cutter by grinding back the front faces of the blades, the relationship between the side cutting edge, the tip cutting edge and the cutter axis will not be changed. With this helical surface, if the cutter is not indexed so that the probe contacts the cutting side face the same distance behind the leading edge for each blade, the measurement made does not correlate with the radial distance from the cutting edge to the axis of the cutter and thus results in inaccurate values. As with the first method of determining the radial trueness of a cutting edge, this error has seriously affected the accuracy with which the blade positions can be checked.

In cutting operations where great accuracy is required, such as in the cutting of spiral bevel and hypoid pinions for use in the automotive industry, the errors in measurement resulting from the above methods require further truing of the cutter while it is on the pinion generating machine thereby involving costly down time. The present invention improves the accuracy of radial truing to such an extent that, even with the inherent errors introduced by transferring the cutters from the cutter inspection machine to the pinion generating machine, the need for truing the cutter once it has been mounted on the pinion generating machine is eliminated.

The electronic measuring unit and method of the present development eliminate the inaccuracies encountered when using the devices and methods of the prior art by measuring the average value of a gap between a capacitance probe and a side cutting face of the blade which is immediately adjacent to, and which includes a part of, the cutting edge of the blade. It has been discovered that such a measurement eliminates errors inherent in prior methods of measurement because the capacitance transducer measures the average gap between the end of the probe and the side cutting face (and the included cutting edge), thereby giving a highly accurate reading (to ten-millionths of an inch) of the radial distance between the cutting edge and the axis of the cutter. In addition, since there is no longer any attempt to take measurements a certain distance back from the cutting edges, the inconsistencies resulting from the second prior art method are also eliminated.

Briefly, the cutter truing device of the present invention comprises a basic embodiment in which the cutter is mounted in a work indexer and a capacitance probe is mounted in a holder which can be positioned adjacent the blades of a cutter retained in the indexer. The measurement is carried out by rotating the indexer and thus moving the blades, relative to the probe, from the rear portion of the cutting side face to the leading or cutting edge of the blade. The capacitance between the probe and blade (which affects the output voltage of the measuring unit) gradually increases as the relative movement between the probe and blade causes the distance between the probe and blade to decrease. The capacitance reaches a readily discernable peak at a point where the cutting edge is well within the effective area of the probe face and then starts to decrease as the relative motion between the blade and probe is continued. After the capacitance probe is set in a predetermined position relative to the master blade of the cutter, the dimension of the air gap between the cutting side face of the blade and the capacitance probe is measured by the magnitude of an output voltage of the measuring unit. The output voltage is proportional to the spacing between the probe and the cutting side face of the blade. The measurement is carried out by moving the blades, relative to the probe, from the rear portion of the cutting side face to the leading or cutting edge of the blade. The capacitance between the probe and blade (which affects the output voltage of the measuring unit) gradually increases as the relative movement between the probe and the blade causes the distance between the probe and blade to diminish. The capacitance reaches a peak as the cutting edge is reached and then starts to decrease as the sensing area of the probe starts to pass beyond the cutting edge. In this way, through the use of a properly calibrated distance meter which is responsive to the output voltage of the measuring unit, the radial trueness of a cutter can be determined without the necessity of the probe actually coming into contact with the cutting edge of a blade and without the need for the probe to contact the blade a certain distance behind the cutting edge thereby eliminating the errors inherent in the measurements made according to prior methods.

A second embodiment of the present invention is employed to measure the cutting side angle of a blade, and in this embodiment the spacing between the probe and a contact element which contacts the cutter blade is measured by the magnitude of an output voltage that is directly proportional to the spacing between the probe and the contact element. As the pivotally mounted contact element contacts the blade, the gap between the detector and the probe is altered if the setting is incorrect thereby enabling the setting of a cutter blade to be determined. The second embodiment enables the same instrument system for radial truing to be used for angle truing.

The above-mentioned objects and advantages and other objects and advantages of the present invention will become more apparent from the following detailed description when taken in conjunction with the accompanying drawings in which:

FIG. 1 is an elevated view of a first embodiment of the invention showing the capacitance probe mounted on the gage slide with the probe adjacent to a cutter blade;

FIG. 2 is a plan view, partially in section, taken along lines 2—2 of FIG. 1 and showing the assembly for securing the probe holder to the gage slide;

FIG. 3 is an elevational view of a second embodiment of the invention wherein a pivotally mounted contact element contacts the cutter blade and the blade angle is inspected by measuring the gap between the capacitance probe and the pivotal contact element;

FIG. 4 is a plan view, partially in section, taken substantially along lines 4—4 of FIG. 3 showing the assembly for mounting the holder on a gage slide;

FIG. 5 is a capacitance probe partially in section, which is used in both embodiments of the present invention;

FIG. 6 is a schematic view of the capacitance probe circuit which produces an output voltage directly proportional to the average spacing between the end surface of the probe and the cutter blade or the contact element; and FIG. 7 is a schematic view illustrating the gage slide adjustments for properly aligning the capacitance probe holders of the present development relative to a blade in a cutter.

DETAILED DESCRIPTION OF THE INVENTION

As shown in FIGS. 1, 3 and 7, the gage units 20, 20' are adapted to be mounted on the gage slide 22 of a cutter inspection machine, of the type disclosed in the U.S. Pat No. 3,099,833, to Bergemann et al. issued Aug. 6, 1963 (the disclosure of said patent being incorporated herein by reference) or other conventional cutter inspection machines. Gage unit 20 comprises a holder 24 which carries a capacitance probe 26, while gage unit 20' comprises a holder 24' which carries both a capacitance probe 26' and a contact element 28.

As schematically shown in FIG. 7, the gage slide 22 of the cutter inspection machine can be adjusted along axes 32 and 34 and angularly adjusted about axis 30 to position holder 24 or 24' relative to a cutter 36. In the schematic representation of FIG. 7, the gage slide has been positioned to check the radial trueness of a blade in cutter 36. The slide has been adjusted about axis 30 so that the longitudinal center line of the capacitance probe intersects the vertical axis of rotation of the cutter 36 and the end face of the probe is parallel to the cutting edge of a blade being checked. In addition, lateral and vertical adjustments have been made along axes 32 and 34, respectively, to obtain the proper relative radial and vertical positions of the probe and cutter blade surface.

The particular mechanisms for accomplishing the movements of the gage slide are not shown in detail, since they are well known in the art. However, it is contemplated that the mechanisms for accomplishing these movements can be identical or similar to the mechanisms disclosed in the above-mentioned Bergemann et al., patent.

The cutter 36 is rotatably mounted in an indexing mechanism wherein the cutter can be indexed automatically or manually rotated about its axis of rotation. It is contemplated that indexing mechanisms such as those disclosed by the above-mentioned Bergemann et al., patent or the patent to Hediger, U.S. Pat. No. 3,166,955, issued Jan. 26, 1965 (the disclosure of said Hediger patent being incorporated herein by reference) can be utilized for mounting and rotating the cutter spindle during the cutter inspection and truing operation.

Referring now to FIGS. 1 and 2, the uppermost portion 38 of capacitance probe holder 24 has a slot 40 for receiving an extension 42 of the gage slide 22. The width of slot 40 is substantially equal to, but somewhat greater than the external diameter of extension 42 whereby the extension 42 of gage slide 22 is slidably received within slot 40, while a lower peripheral flange on the extension engages the underside of the holder to retain the holder on the extension. The innermost end of slot 40 is rounded having a curvature substantially equal to but somewhat greater than the external diameter of extension 42 and cooperates with a spring-biased retaining element 44 to prevent lateral movement of the capacitance probe holder relative to the extension 42 once the extension has been snapped past the retaining element.

Retaining element 44 is an elongated element having a conical end 46 for engaging extension 42, a cylindrical intermediate portion 48 and an enlarged hollow, spring-retaining portion 50. Element 44 is mounted within an aperture 52 passing from slot 40 through portion 38 and extending perpendicular to the longitudinal centerline of slot 40. Aperture 52 is of varying internal diameter having a first portion with a diameter substantially equal to but greater than the external diameter of portion 48 of element 44 and a second portion with an internal diameter substantially equal to but greater than the external diameter of spring-retaining portion 50 of element 44 whereby element 44 is slidably retained within aperture 52.

A hollow plug 54, which is closed at its outer end, is received within aperture 52 and is held within the aperture by a set screw 56 or equivalent fastening means. Coil spring 48 extends between the interior end walls of spring-retaining portion 50 of element 44 and plug 54 thereby biasing element 44 toward slot 40. The inward movement of the element 44 is limited by shoulder 60 of aperture 52 which cooperates with shoulder 62 on element 44 and the outward movement of element 44 is limited by the opposing annular surfaces of plug 54 and element 44. However, normally there is no contact between plug 54 and element 44 since the space between the annular surfaces on element 44 and plug 54 is such that element 44 can be forced into aperture 52 to permit the passage of extension 42 without the opposing ends of element 44 and plug 54 contacting.

As can be seen in FIG. 2, aperture 52 is located along the sidewall of slot 40 so that the conical surface 46 of element 44 will contact the exterior surface of extension 42 thereby firmly clamping the work holder to the extension 42. To properly align holder 24 on the slide 22, an aperture 64 is provided in the upper surface of portion 38 which, in the preferred form, has a centerline that passes through the center of curvature of the rounded end portion of slot 40 and is perpendicular to the longitudinal centerline of slot 40. This aperture 64 is adapted to receive an aligning element such as a spring-biased pin or ball element 68 to thereby properly position the work holder about the longitudinal axis of slide 22.

An arm 72 depends from and connects portion 38 with an annular portion 74 which has an aperture with a horizontal centerline extending in the same vertical plane as the centerline passing through aperture 64 and the center of curvature of the inner end portion of slot 40. A bushing 76 is slidably received within the aperture of annular portion 74 and is held therein by a threaded locking element 78 which passes through a threaded aperture in a sidewall of bushing 76. The innermost end of threaded locking element 78 extends inwardly beyond the sidewall of the aperture in portion 74 and cooperates with a soft metal collar 80 extending about the midportion of bushing 76 to firmly lock the bushing in place. Probe 26 is slidably received within bushing 76 and is locked therein by means of setscrew 82 whereby the probe can be rigidly locked within bushing 76 against any axially movement during the cutter inspection and truing operation.

Referring now to FIGS. 3 and 4, a modified form of the invention is shown for measuring blade angles. The modified form of the invention comprises a capacitance probe 26', a pivotal contact element 28 and a holder 24' for mounting the unit on the gage slides of cutter inspection machines such as the cutter inspection machine disclosed in the patent to Bergemann et al. U.S. Pat. No. 3,099,883, issued Aug. 6, 1963 or other conventional cutter inspection machines.

The holder 24' is an elongated element substantially channel-shaped in transverse cross section and having an upper web 90 interconnecting a pair of vertically extending flanges 92, 94 which depend from web 90. A clamping portion 38' is provided at one end of holder 24' for mounting the holder on gage slide 22. However, since portion 38' is identical in construction to portion 38 of holder 24 and cooperates with extension 42 of gage slide 22 in the same manner as portion 38 of holder 24, the structure of portion 38 will not be described in detail to avoid repetition. However, it is to be understood that the components of portions 38, 38' which are indicated by corresponding unprimed and primed reference numerals are identical in construction and function.

A pair of vertically extending apertures 96 and 98 are provided in holder 24' adjacent the probe retaining end of the holder. Aperture 96 extends down through web 90 and portions of flanges 94, 96, while aperture 98 extends down through web 90 and flange 92. As best shown in FIG. 4, aperture 98 is in an offset portion of holder 24' which has a planar upper surface 100 against which a flange of the probe retaining bushing abuts to position the probe within the holder.

A slot 102 passes through web 90 and extends from aperture 96 through aperture 98 to the free end of holder 24'. The slot cooperates with a threaded locking element 104 that passes transversely through the slot to provide a means for reducing the effective diameter of aperture 98 for the purpose of clamping a probe supporting bushing within aperture 98. As best shown in FIG. 4, shoulder 106 on element 104 abuts a complementary shoulder in an unthreaded portion of aperture 108 which passes through web 90, while a threaded end of the locking element is received within a threaded portion 110 of aperture 108. With this arrangement, clockwise movement of the knob on element 104 causes the sides of slot 102 to be drawn toward each other thereby lessening the effective diameter of aperture 98 and counterclockwise movement of the knob allows the sides of the slot to separate thereby enlarging the effective diameter of aperture 98.

In addition to aperture 98, the offset portion of holder 24' has a horizontally extending aperture 112 therein which extends through flange 92 and intersects aperture 98. The aperture 112 is provided for the purpose of viewing the lower free end of capacitance probe 26' and the corresponding upper surface on the offset portion of contact element 28.

As in the first embodiment, capacitance probe 26' is housed within a bushing 76' which is provided with a setscrew for locking the probe within the central longitudinal aperture of the bushing. Annular flange 114 on the bushing contacts the upper surface of the offset portion of holder 24' to limit the downward movement of the bushing relative to the holder and position the probe within the holder. The bushing is locked in position by the tightening of threaded element 104 which reduces the effective diameter of aperture 98 until the bushing is firmly held within the aperture.

Contact element 28 is pivotally mounted in holder 24' and is substantially L-shaped in configuration having a pair of arms 116, 118 extending at substantially right angles with respect to each other. Arm 116 has an offset terminal portion 120 with a planar upper surface that cooperates with capacitance probe 26' during the angle truing operation. The other arm 118 which depends from arm 116 is provided with a nib 122 for contacting the blade surface. With this arrangement, any error in the blade setting being checked is picked up by nib 122 causing pivotal movement of the contact element 28. The pivotal movement of the contact element 28 and, consequently, the error in the blade setting is measured by the change of capacitance between the offset portion of the contact element and the probe due to the change in the width of the air gap between the probe and contact element.

As best shown in FIG. 3, contact element 28 is pivotally mounted on a flexural pivot 124 extending through a pair of axially aligned apertures 126, 128 in flanges 92 and 94. The vertically extending slots 130, 132 in flanges 92 and 94 pass through aligned apertures 126, 128 permitting a limited expansion of the apertures during the insertion of rod 124 whereby the rod is frictionally held within the apertures.

In the preferred form of the invention, probes 26, 26' can be identical. Therefore, the following detailed description of capacitance probe 26 applies also to capacitance probe 26' utilized in the second embodiment. As shown in FIG. 5, the capacitance probe has a cylindrical active element 140 which forms one plate of a capacitor whose other plate is formed by the cutter blade being checked or the contact element 28. The active element 140 is surrounded by a concentric guard ring or sleeve 142 having an internal diameter somewhat greater than the external diameter of the active element 140 to insure that the field of measurement is limited to the diameter of active element 140. An outer insulating shell 144 encloses both the guard sleeve and the active element and isolates these from ground. In the preferred form of the invention, a capacitance probe having the following characteristics is utilized: probe range 10 mils, maximum temperature 400° F., sensitivity 100 v./in., repeatability 20 microin and resolution 10 microin. A probe meeting these requirements is commercially available and does not form a separate part of this invention.

As shown in FIG. 6, probes 26, 26' and the blades of the cutter 36 or the contact element 28 form a capacitor $C_p$ which completes a negative feed back loop that is incorporated into the high-gain amplifier of an electronic measuring circuit. The amplifier reference $V_1$ is supplied by an internal 50 kilocycle oscillator and the output voltage of the amplifier is directly proportional to the probe-to-blade or probe-to-contact element distance whereby the output voltage can be utilized to indicate the width of the air gap on a properly calibrated meter. Distance meters or instruments having the required circuit for performing such a measurement are commercially available on the market today.

When it is desired to use the above measuring circuit with an oscilloscope or a recorder so that a permanent record can be kept, a conventional filter balance unit (not shown) is incorporated into the circuit to remove the high-frequency component of the circuit output to prevent this component from interfering with the displayed or recorded information. A balance filter unit used in the preferred form of the invention is capable of suppressing a 50 kilocycle carrier and its harmonics by at least a factor of 20.

Referring now in detail to FIG. 6, which is an operational diagram of an electronic circuit utilized to measure the distance between the capacitance probe 26, 26' and the cutter blade or contact element, the operation of the circuit is expressed by the following formulation wherein with large values of amplifier gain A, the voltage potential across resistance R, approaches zero, and the following relationship between currents $i_1$ and $i_2$, the input voltage $V_I$, the angular velocity $\omega$ which equals $2\pi$ times the frequency and capacitance $C_I$ exists $$i_2 \rightarrow i_1 = V_I \omega C_I$$

but $V_I$, $\omega$, and $C_I$ are all constants therefor
$i_2 \rightarrow k_1$, a constant, and since $$i_2 = V_0 \omega C_P, \text{ then } \overline{V_0 C_P} \rightarrow \frac{k_1}{\omega} = k_2$$

Capacitance is related to the width of the air gap between the probe and the cutter blade or contact element by the formula $$C_P = \frac{KE}{d} = \frac{k_3}{d}$$

where $K$ is a constant of proportionality and $E$ is the dielectric constant,

Thus $V_0 \frac{k_3}{d} \rightarrow k_2$, $K_2$ being a constant, or $V_o \sim k_4 d$, $k_4$ being a constant, and $V_o$ is seen to be directly proportional to "$d$," the width of the air gap between the probe and the cutter blade or contact element.

OPERATION

When inspecting a cutter for the radial trueness of the cutter blades in a cutter inspection machine, the cutter to be checked (which has preferably already been checked and corrected for blade angle accuracy) is mounted on the spindle of the machine and the capacitance probe 26, which has been previously mounted in the holder 24, is attached to the extension 42 on the gage slide 22 of the machine. In order to adjust capacitance probe 26 relative to the cutter 36 for the radial trueness check, a reference or master blade on the cutter, such as blade No. 1, is selected. Next, the gage slide angle is set about axis 30 to the pressure angle marked on the master blade. This positions the probe 26 so that its centerline passes substantially through the cutter axis and makes the probe face parallel to a plane tangent to the surface of revolution swept by the blade side cutting edge. With the probe set up in this manner, the readings obtained as a result of the output $V_o$ of the amplifier are dependent on the radial setting of the blades.

Once the probe 26 has been angularly adjusted about axis 30, the probe is positioned adjacent the master blade by moving the gage slide laterally along horizontal axis 32 and in the direction of the gage slide's longitudinal axis 23 along the preset angle until the centerline of the probe intersects the blade profile a distance down from the blade top that is equal to approximately one-half the cutting depth of the blade. To determine the proper distance between the probe and the blade for the final adjustment along axis 32, rotate the master blade back and forth past the probe and move the gage slide laterally along axis 32 until the output voltage of the amplifier indicates that the air gap between the probe tip and the blade surface is 0.007 inches at the minimum air gap position. The gage slide 22 can then be locked in place and the probe 26 is in the correct operating position relative to the cutter. The truing meter or recorder is then adjusted to read zero at its peak value as the master blade is slowly rotated past the probe and this reading serves as the reference against which the other blades will be compared.

To obtain a reading on the trueing meter or recorder, manually rotate the cutter blade being checked slowly by the probe 26 in the direction opposite to the direction or rotation when cutting. Due to the contour of the cutting side face, the distance between the probe 26 and the blade cutting side face gradually decreases as the probe moves relative to the side face toward the leading cutting edge of the blade being checked. This causes an increase in capacitance of capacitor $C_u$ and a decrease in the voltage output $V_o$ of the amplifier. Then, as the probe tip starts to pass beyond the cutting edge, the capacitance of capacitor $C_u$ peaks and then begins to decrease while the output voltage $V_o$ of the amplifier reaches a nadir and then increases. The output voltage of the amplifier is measured on a voltmeter (either a digital, a panel meter or a recording type) which is calibrated to display to high resolution (10 microinches) the variations in the blade to probe distance. The calibrations on the voltmeter are such that when the voltage output $V_o$ reaches its nadir, the meter gives a peak reading. Thus, the peak reading is obtained when the cutting edge passes the probe and this peak reading gives the indication of the radial distance of the cutting edge from the center of the cutter. It may be necessary to rotate the blade by the probe several times initially to determine the correct rotational speed for stable peak readings. However, once the correct rotational speed is determined, the need for rotating the blade by the probe several times is eliminated. As indicated above, the cutter should be rotated in the direction opposite to that in which it normally rotates when cutting.

For the purpose of further illustrating the present invention, the steps of the operation will be repeated wherein a cutter blade is to be trued to plus or minus ten-millionths of an inch.

With the probe in a position which is aligned with the cutter to intersect the blade profile a distance down from the blade top that is equal to approximately one-half the cutting depth of the blade, a peak reading is obtained for the master blade which gives a 0.007 inch reading on the voltmeter which is calibrated to give a distance reading. This reading is then used to set the truing meter or recorder to zero at this peak. The cutter is then rotated in the proper direction to the next blade and a reading is taken. A plus reading indicates that the blade is closer to the probe then the master blade and a minus reading indicates that the blade is farther from the probe than the master blade. After noting the reading of the blade and the direction of correction needed, the blade is rotated away from the probe and the holding screw for the blade is loosened. Next, the adjusting screw for the blade adjustment wedge is turned in the proper direction to reposition the blade after which the screw is retorqued properly. New readings for the blade are taken and the above-described process is continued until the blade is within plus or minus ten-millionths of the zero reading. Once the desired tolerance has been obtained on each blade, a final reading is taken on each blade and recorded.

In angle truing, as in radial truing, the cutter is mounted on the spindle, the holder 24' with the contact lever 28 and capacitance probe 26' is mounted on the gage slide 22 and a reference or master blade, such as cutter blade No. 1, is selected for adjusting the contact lever 28 relative to the cutter 36. After the holder 24' has been mounted on the gage slide, the gage slide angle about axis 30 is set to the pressure angle marked on the master blade. This positions the centerline of the gage slide 22 parallel to a plane tangent to the cutting side faces of the blade. The cutter should be rotated so that probe contacts blade 0.010–0.015 behind cutter edge. At this time the index pawl should be engaged with a slot in index plate. Then, by actuating the gage slide for reciprocal movement along axis 34, the pressure angle of the master blade is trammed and any necessary minute adjustments in the gage slide angle to establish a zero reading on the meter over the tramming range at the master blade angle is made. It should be noted that in this check, the capacitance probe 26' is making a direct measurement through the lever arrangement, but the actual pick up from the blade is on the contacting nib of the lever element 28.

After the zero reading has been established for the master blade, the cutter is indexed and the next succeeding blade is trammed in the same manner as the master blade and over the same range with any variations in the blade pressure angle during the tramming along the blade being recorded. When variations are uncovered, corrections are made by removing the blade and replacing the adjusting wedge with a corrective wedge which has a slightly different pressure angle. The blade is then replaced and another check is made. After all of the blades have been corrected, the check is repeated to insure that the angle corrections have achieved the desired tolerance limits and the angle truing operation is completed.

While for the purposes of illustrating the cutter inspection apparatus and methods of inspection of the present development, the invention has been shown and described in connection with cutter truing operations where the leading cutting edges of the cutter blades are on the outside, it is to be understood that the apparatus and methods of the present invention can be used with and applied to cutters having the blade cutting edges on the inside or alternately on the outside and inside. With a cutter having blade cutting edges alternately on the outside and inside, it is necessary to first true one set of blades and then repeat the operation to true the other set.

Having now described the preferred embodiments of the cutter inspection assembly and the preferred method of operating the assembly for cutter inspection and truing, it will be apparent that various modifications and equivalents can be resorted to without departing from either the spirit or scope of the invention.

We claim:

1. A method of inspecting a plurality of cutter blades on a cutting tool for blade-to-blade truing purposes wherein each said blade includes a leading cutting edge and a relieved side face which tapers from said cutting edge to the back of the blade, said method comprising:

positioning said cutter blades for movement with respect to a capacitive probe thereby defining an air gap therebetween having a width dependent upon the position of one of said blades with respect to said capacitive probe, moving a first master one of said blades past said capacitive probe by rotating said cutting tool relative to said probe so that each successive cutter blade approaches the probe from back to front whereby the probe first senses the rear of said relieved sideface of each cutter blade, the capacitance building up to a peak which drops off relatively fast when the cutting edge of the blade is passed, measuring and noting a minimum indicated average reference air gap for the master blade during said moving step, local effects due to small surface irregularities on said cutter blades being minimized by always measuring an instantaneous average air gap, moving the other of said blades past said capacitive probe from back to front in the same manner employed for the master blade, and measuring and noting the minimum indicated average air gaps respectively associated with each of said other blades if materially different than said reference air gap to thereby determine any untrued blades.

2. A method as in claim 1 further comprising the steps of:

individually adjusting the positioning of the said untrued ones of said blades relative to the cutting tool in a direction to compensate for the noted material air gap differences, and moving at least the adjusted ones of said blades past said reference means again and noting the minimum indicated air gaps if materially different than said reference air gap thereby determining if further adjustment is necessary.

* * * * *